(12) United States Patent
Phillips et al.

(10) Patent No.: US 6,413,131 B1
(45) Date of Patent: Jul. 2, 2002

(54) AIR FLOW SYSTEM FOR AN OUTBOARD MOTOR

(75) Inventors: George E. Phillips, Oahkosh; Wayne M. Jaszewski, Jackson; John M. Griffiths, Fon du Lac, all of WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/817,394

(22) Filed: Mar. 26, 2001

(51) Int. Cl.[7] ............................................... B63H 21/10
(52) U.S. Cl. ..................................... 440/88; 123/198 E
(58) Field of Search .................. 440/88, 89; 123/198 E, 123/41.05

(56) References Cited

U.S. PATENT DOCUMENTS

| | | |
|---|---|---|
| 4,326,600 A | 4/1982 | Okazaki et al. ............... 181/99 |
| 4,952,180 A | 8/1990 | Watanabe et al. ............. 440/77 |
| 5,176,551 A | 1/1993 | Blanchard et al. ............ 440/88 |
| 5,181,871 A | 1/1993 | Hiraoka et al. ................ 440/77 |
| 5,445,547 A | 8/1995 | Furukawa ...................... 440/77 |
| 5,899,778 A | 5/1999 | Hiraoka et al. ................ 440/88 |
| 5,937,818 A | 8/1999 | Kawai et al. ................. 123/198 |
| 5,938,491 A | 8/1999 | Kawai et al. .................. 440/77 |
| 5,996,546 A | 12/1999 | Kollmann et al. .......... 123/195 |
| 6,024,616 A | 5/2000 | Takayanagi ................... 440/77 |

*Primary Examiner*—Jesus D. Sotelo
(74) *Attorney, Agent, or Firm*—William D. Lanyi

(57) ABSTRACT

An outboard motor is provided with an air duct located within the cavity of a cowl of an outboard motor. The air duct defines a chamber within it in association with first and second openings that allow heated air to flow, through the creation of convection currents, out of the engine compartment under a cowl. This convection flow removes heat from fuel system components and reduces the likelihood that "vapor lock" will occur subsequent to the use of an internal combustion engine that is followed by turning the engine off.

20 Claims, 3 Drawing Sheets

AIR FLOW SYSTEM FOR AN OUTBOARD MOTOR

BACKGROUND OF THE INVENTION

1. Field of the Invention

The present invention is generally related to an air ventilation system for an outboard motor and, more particularly, to a ventilation system that utilizes an air duct to conduct air in thermal communication with selected fuel supply system components, particularly when the engine is turned off following operation for a period of time sufficient to raise the temperature of portions of the engine.

2. Description of the Prior Art

Air ventilation systems for outboard motors of various types are well known to those skilled in the art.

U.S. Pat. No. 4,326,600, which issued to Okazaki et al on Apr. 27, 1982, describes an intake silencer for an outboard motor. The outboard motor includes a cowling with a cavity that receives a carburetor that supplies the engine with an air/fuel mixture. The carburetor has an air intake port. An air intake passage connects to this port and bends partway around the carburetor. A resonance chamber communicates with the air intake passage and faces the carburetor to attenuate the noise from the carburetor intake port.

U.S. Pat. No. 4,952,180, which issued to Watanabe et al on Aug. 28, 1990, describes a cowling for an outboard motor. Two embodiments of the protective cowlings for the power head of an outboard motor that form both forwardly and inwardly facing air inlet passages are described. The forwardly and rearwardly facing air inlet passages are configures to ensure adequate air induction to the engine. The forwardly facing air inlet opening is located so as to avoid water being able to enter into the interior of the protective cowling and into the engine induction system.

U.S. Pat. No. 5,176,551, which issued to Blanchard et al on Jan. 5, 1993, describes an arrangement for supplying combustion air to an outboard motor. The marine apparatus comprises a boat including a wall extending generally in the fore and aft direction and having therein an air outlet opening. It further comprises a propulsion unit mounted on the boat and including a propeller shaft and an engine drivingly connected to the propeller shaft. A cover surrounds the engine and has therein an air inlet opening with a duct communicating between the air outlet opening and the air inlet opening.

U.S. Pat. No. 5,181,871, which issued to Hiraoka et al at Jan. 26, 1993, describes a suctioned air introducing system for an outboard motor. The device provides an improved cowling and air inlet arrangement for the powerhead of an outboard motor, having an internal combustion engine including an induction system, which prevents water from splashing upon the outer surface of the engine contained therein. Damage to the engine due to corrosion, or other phenomena is avoided, since the arrangement of the invention does not permit water to impinge upon the engine.

U.S. Pat. No. 5,445,547, which issued to Furukawa on Aug. 29, 1995, describes an outboard motor which has an engine compartment covered by an engine cover at its top portion and has an engine disposed within the engine compartment with its crankshaft directed in the vertical direction. The charging efficiency of the engine is improved with a simple structure and an shielding property of the entire surrounding of the engine is also enhanced. A suction chamber communicating with an intake section of the engine is disposed on a surface other than the top surface of the engine and on one side of the inside of the engine compartment, an air intake portion is provided in the engine cover at a position close to the other side of the inside of the engine compartment, an air exhaust port is provided in the engine cover, and a duct is provided within the engine compartment for leading air from the air intake port towards the suction chamber while making a detour to avoid a route above the engine.

U.S. Pat. No. 5,899,778, which issued to Hiraoka et al on May 4, 1999, describes an outboard motor induction system. An induction system is of the type having a water propulsion device powered by an internal combustion engine positioned within an engine compartment defined by a cowling. The induction system includes a cover extending over a top end of the engine. The cover defines an air duct leading from an intake chamber defined by the cowling to an intake pipe of the air intake system of the engine. The cover also defines an air duct in communication with the engine compartment and leading to an exhaust chamber defined by the cowling. A pair of intake ports lead through a cover of the cowling form the intake chamber, and an exhaust port leads through the cover from the exhaust chamber. The intake ports are positioned forward of the exhaust port when considering the forward movement of a watercraft which is powered by the motor.

U.S. Pat. No. 5,937,818, which issued to Kawai et al on Aug. 17, 1999, describes a ventilation system for an outboard motor. The ventilating system has a water propulsion device and an internal combustion engine positioned in a cowling, the engine having an output shaft arranged to drive the water propulsion device. The ventilating system includes an air inlet in the cowling which permits air to flow into the engine compartment in which the engine is positioned, and an exhaust port positioned in the cowling. The system also includes a mechanism for drawing air through the inlet into the compartment and expelling air out of the compartment through the exhaust port after the engine has stopped.

U.S. Pat. No. 5,938,491, which issued to Kawai et al on Aug. 17, 1999, describes a cowling air inlet for an outboard motor. The protective cowling arrangement defines an air inlet opening for an outboard motor that facilitates the ingestion of large amounts of air at low velocity. This aids in the assurance that water is not ingested into the engine. The configuration of the inlet opening is such that the water that is separated by the inlet system can easily flow away from the inlet opening and also the water that collects on the housing surfaces can be easily separated and will drain away from the actual inlet openings into the interior of the cowling.

U.S. Pat. No. 5,996,546, which issued to Kollmann et al on Dec. 7, 1999, discloses an integrated flywheel cover and air conduit passages. A cover for an outboard motor is provided to protect an operator from a flywheel. The cover is disposed under the cowl of the outboard motor. The cover is made of a generally rigid material, such as plastic, with first and second sheets being associated together to form conduits with openings extending therefrom. In one particular embodiment, one of the openings is shaped to receive an inlet of a compressor and this provides a positioning aid in attaching the cover to the engine. This device eliminates the need for flexible hoses and accomplishes two tasks with one component. It provides air conduits for the air passing through the cover and it provides a generally rigid means for locating the proper location of the cover.

U.S. Pat. No. 6,024,616, which issued to Takayanagi on Feb. 15, 2000, describes an engine cover for an outboard motor. The outboard motor includes an engine which is covered by an engine cover which is formed with a cylindrical air suction port having an opening open to an upper surface of the engine cover in a state of the outboard motor mounted to a hull, and a portion of an opening area of the opening is covered by a lid member which is formed to a rear edge portion of the opening.

Many different types of cowls, for covering the engine of an outboard motor, are well known to those skilled in the art. Typically, the cowls are provided with one or more openings that allow air to flow into the engine compartment of the outboard motor from the ambient air surrounding the outboard motor. This air is used during the combustion processes of the engine and also provides a cooling effect. Some cowls that are known to those skilled in the art also provide for ventilation openings that facilitate the removal of heat from the internal portions under the cowl, particularly after the engine is turned off.

When outboard motors are operated and then turned off, the natural characteristics of most outboard motors cause heat from the internal combustion engine to flow by convection and conduction toward components of the fuel delivery system of the engine. This heat transfer process, after the flow of internal cooling water stops, raises the temperature of the fuel system components and can lead to the deleterious situation referred to as "vapor lock" that is caused by the boiling or vaporization of liquid fuel within the components and conduits of the fuel system. This problem can continue to exist long after the engine is turned off and it can adversely affect the ability of the engine to start. Typically, this condition referred to as "vapor lock" is only alleviated after the engine is cooled to a temperature low enough to condense the gaseous fuel back into a liquid state.

It would therefore be significantly beneficial if an inexpensive and simple method could be provided for facilitating the cooling of an internal combustion engine subsequent to the engine being turned off. In addition, it would be significantly beneficial if an outboard motor could be provided in which natural ventilation is available to quickly remove heat from the fuel system components of the engine of an outboard motor.

SUMMARY OF THE INVENTION

An outboard motor ventilation system made in accordance with the present invention comprises an engine and a cowl having a cavity therein, with the engine being disposed within the cavity. It further comprises a fuel system component that is connected in fluid communication with the engine in order to supply fuel to one or more combustion chambers of the engine. The fuel system component is external from the engine block itself and is disposed under the cowl. The present invention further comprises an air duct disposed within the cavity of the cowl. The air duct has a first opening and a second opening. The walls of the air duct define a chamber, within the body of the air duct, and the chamber is disposed in fluid communication between the first and second openings. The fuel system component is disposed at least partially within the chamber of the air duct. The first and second openings connect the chamber in fluid communication with air which is outside of the cowl. As a result of the structure of the present invention, a stream of air, supported by convection flow of heated air, is directed through the chamber and between the first and second openings. This stream of air flows through the chamber and in thermal communication with the fuel system component to remove heat by convection as cooler air passes over the fuel system component.

In a particularly preferred embodiment of the present invention, the air duct is formed to inhibit air flow between the cavity under the cowl and the chamber within the air duct. The first opening is disposed at a lower location than the second opening in order to facilitate the natural conduction flow of heated air through the chamber from the first opening to the second opening. This convection flow does not require operation of the engine and, therefore, provides a cooling flow of air past the fuel system component after the engine is turned off.

In one embodiment of the present invention, the first opening is disposed at a front portion of the outboard motor and the second opening is disposed at a back portion of the outboard motor. The fuel system component can be a fuel pump, a fuel conduit, a fuel rail of a fuel injection system, a carburetor of a carbureted system, or a compressor of a fuel injected system. The air duct can be formed to prevent air flow between the cavity and the chamber, but this is not a requirement in all embodiments of the present invention.

BRIEF DESCRIPTION OF THE DRAWINGS

The present invention will be more fully and completely understood from a reading of the description of the preferred embodiment of the present invention in conjunction with the drawing; in which.

DESCRIPTION OF THE PREFERRED EMBODIMENT

Figure 1:
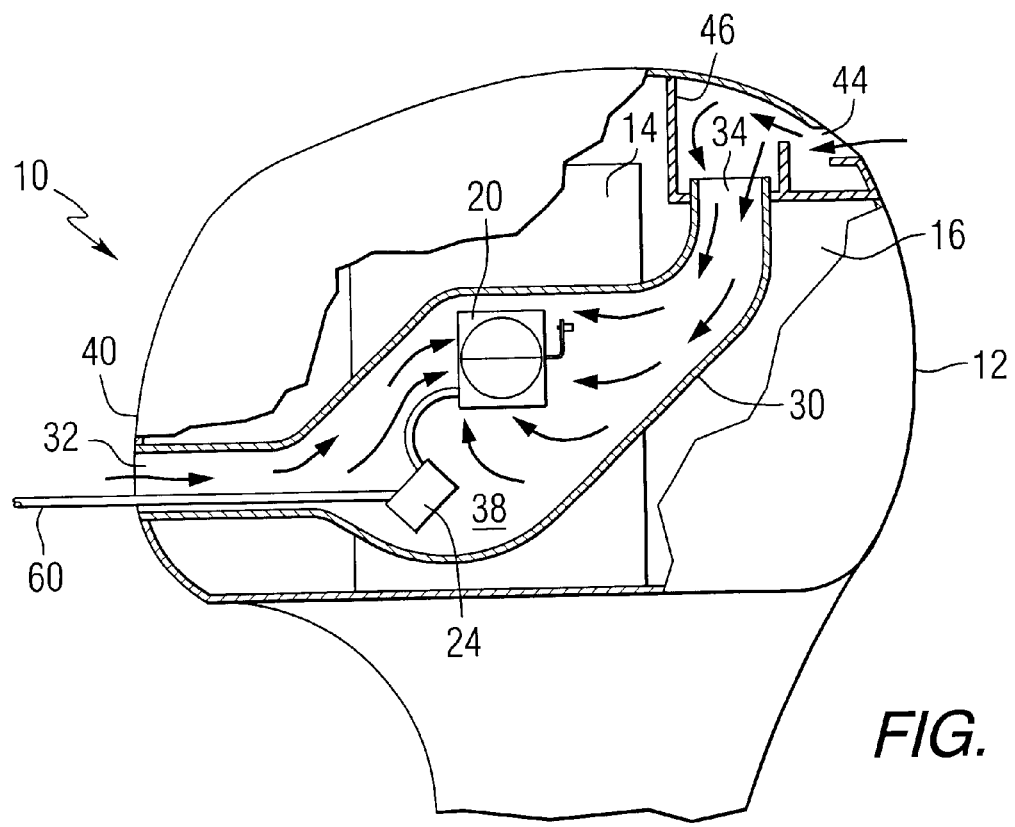
FIGS. 1 and 2 show a preferred embodiment of the present invention.

Throughout the description of the preferred embodiment of the present invention, like components will be identified by like reference numerals.

FIG. 1 shows an outboard motor 10 with a cowl 12 disposed over an engine cavity 16 in which an engine 14 is disposed. The engine 14 is located within the cavity 16 defined by the cowl 12. Fuel system components, such as the carburetor 20 and fuel pump 24, are connected in fluid communication with the engine 14 in order to supply fuel to one or more combustion chambers of the engine 14. The fuel system components are external from the engine 14 and disposed under the cowl 12. An air duct 30 is disposed within the cavity 16 of the cowl 12. The air duct 30 has a first opening 32 and a second opening 34. The air duct 30 defines a chamber 38 within its structure with the chamber 38 being disposed in fluid communication between the first and second openings, 32 and 34. The first and second openings connect the chamber 38 in fluid communication with air which is outside the cowl 12.

The arrows in FIG. 1 illustrate the flow of air within the air duct 30 when the engine 14 is operating. The carburetor 20 or, alternatively, the throttle body of the engine, draws air into the engine for use in the combustion process. This air is provided to the carburetor 20 from two directions. Air can flow to the carburetor 20 from the first opening 32 that is located in a front portion 40 of the cowl 12. Air also flows into the second opening 34 which is disposed in fluid communication with an air inlet 44 formed in the cowl 12. The air inlet 44 and its surrounding baffle structure 46 is generally conventional in nature and known to those skilled in the art. Normally, air flowing through the air inlet 44 communicates with air in the cavity 16 of the cowl 12 and is able to flow throughout the space of the engine 14 and the cowl 12. The air duct 30 of the present invention directs incoming air from the air inlet 44 into the second opening 34 of the air duct 30 of the present invention and then toward the carburetor 20.

In FIG. 1, a fuel line 60 is shown providing fuel from a fuel tank of a marine vessel to the fuel pump 24. However, it should be understood that the routing of the fuel line 60, along with the use of a fuel pump 24 with the carburetor 20 and their respective locations, are not limiting to the present invention.

Figure 2:
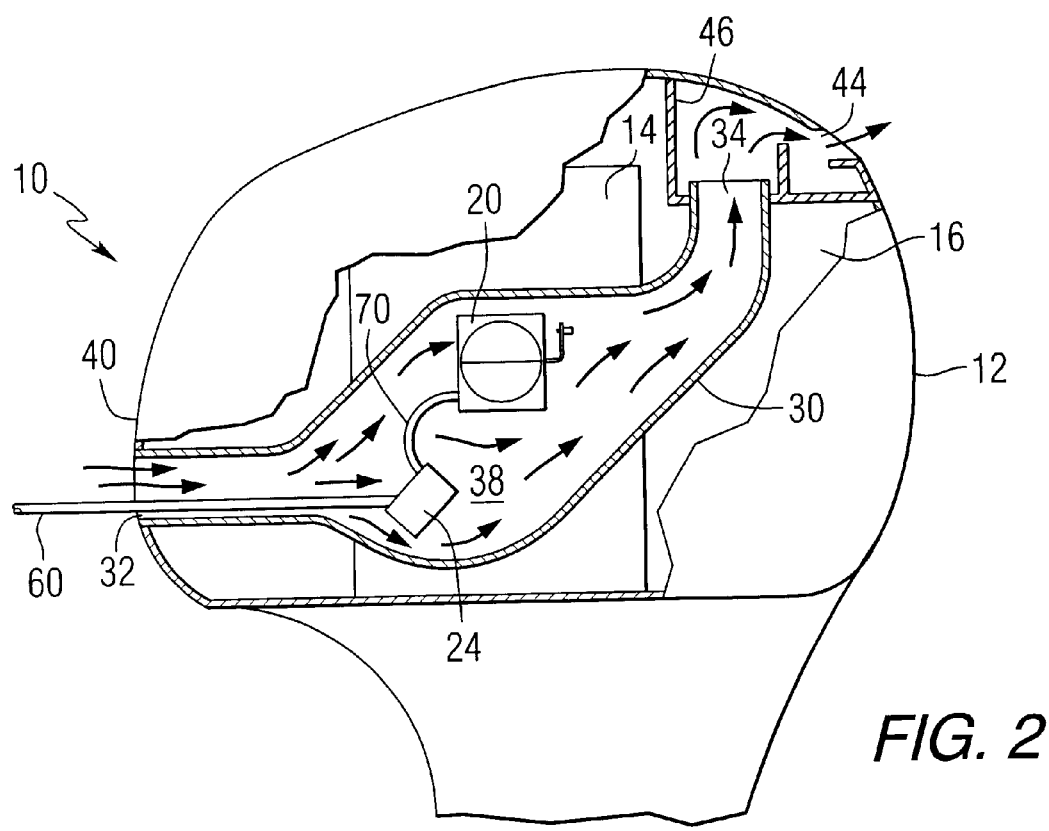

FIG. 2 shows the outboard motor 10 with the engine 14 disposed within the cavity 16 defined by the cowl 12. The illustration in FIG. 2 is intended to show the operation of the present invention during the period of time after the engine 14 is turned off. Since heat is conducted from the heat transmitting portions of the engine 14 to the components of the fuel system, represented by the fuel pump 24 and the carburetor 20 or throttle body, in FIG. 2, the heat from these fuel components will tend to travel upward by convection. Since heat rises, the heat from the fuel components will be conducted from the main chamber 38 of the air duct 30 toward the second opening 34. From the second opening 34, the warmed air will pass out of the cowl 12 through the air inlet 44. Cooler air will therefore be drawn into the first opening 32 from the front portion 40 of the outboard motor 10. Since the second opening 34 is located at a higher position than the first opening 32, a natural convection stream of air will be induced through the chamber 38, removing heat from the fuel system components subsequent to the engine being turned off. As long as the fuel system components, such as the fuel pump 24 and the carburetor 20, with its intermediate conduit 70, are receiving heat conducted to them from the engine 14, the emitted heat will tend to rise within the chamber 38 of the air duct 30 and flow upward toward the second opening 34. This, in turn, will draw cooler air from the outside of the cowl 12 and through the first opening 32.

In FIGS. 3–6, the engine 14 is not specifically shown under the cowl 12. However, it should be understood that the fuel system components located within the chamber 38 of the air duct 30 are physically connected in fluid communication with an engine and, after the engine is turned off, receives heat through conduction as a result of their proximity to the engine. The engine 14 is not shown in FIGS. 3–6 for reasons of simplifying those illustrations.

Figure 3:
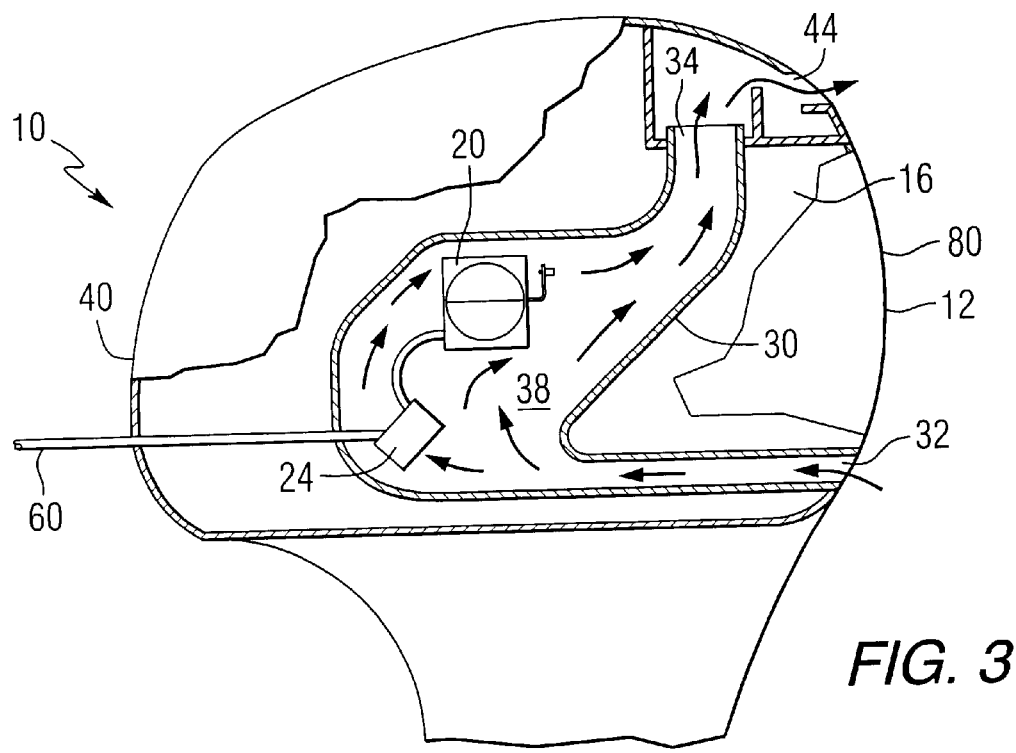
FIG. 3 shows an alternative embodiment of the present invention with the first opening extending in a rearward direction.

The embodiment shown in FIG. 3 is similar to that illustrated in FIG. 2, but with the first opening 32 located at a rear portion 80 of the outboard motor 10. The operation of the air duct 30 is the same as that described above in conjunction with FIGS. 1 and 2. When the engine is turned off, warm air flows from the fuel system components, 20 and 24, and from the chamber 38 toward the second opening 34 of the air duct 30. The warm air then flows out of the air inlet 44 formed in the cowl 12. This convection flow draws cool air into the first opening 32. The flow of cool air over the fuel system components removes heat from them and decreases the likelihood that vapor lock will occur.

Figure 4:
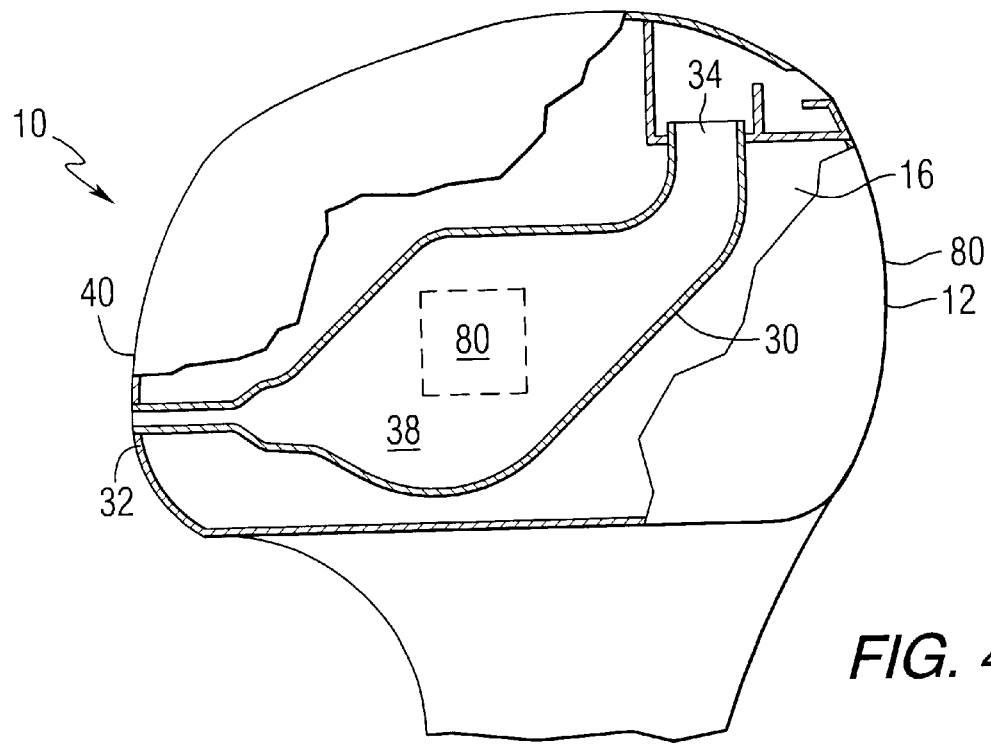
FIG. 4 shows a first opening of the present invention which is reduced in size to limit noise emanating from the outboard motor.

FIG. 4 shows a representation of an outboard motor with the air duct 30 of the present invention located within the cavity 16 defined by the cowl 12. The fuel system components are simplified and illustrated as a dashed box 80 in FIG. 4. The difference between the arrangements shown in FIG. 4 and that illustrated in FIG. 2 is that the first opening 32 is significantly smaller in diameter than the version shown in FIG. 2. This is done in order to attenuate the sound that can be transmitted from the fuel system components, such as a carburetor, in a direction toward the operator of the marine vessel. The reduced size of the first opening 32 attenuates this sound that could otherwise emanate from the carburetor or throttle body through the first opening 32 toward the operator.

Figure 5:
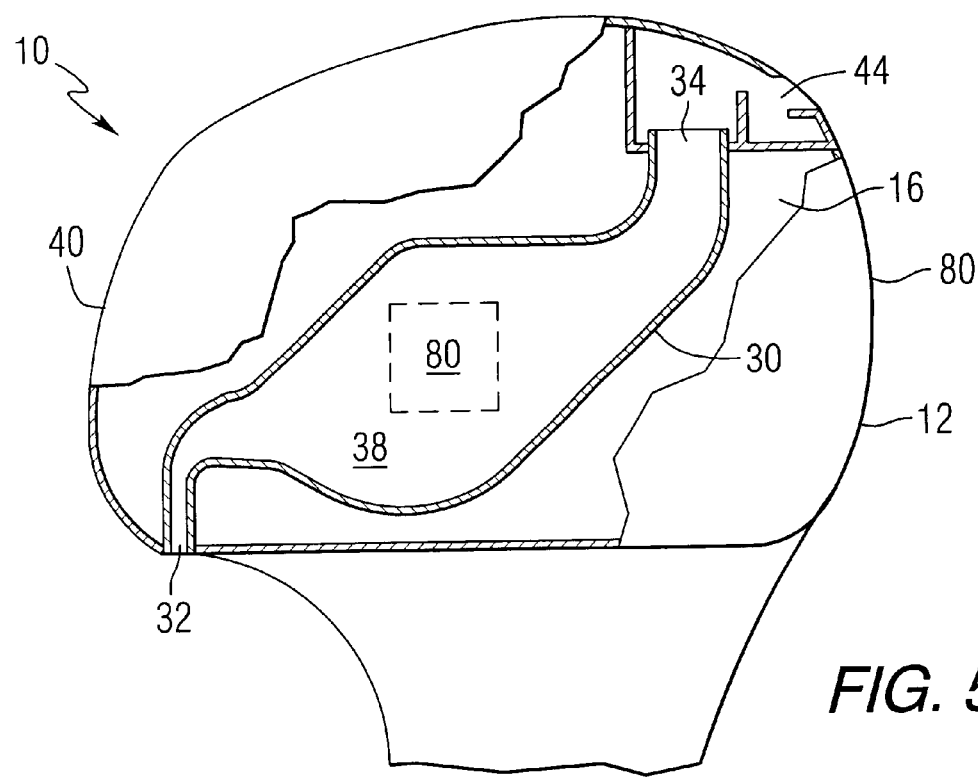
FIG. 5 has a first opening directed downward.

FIG. 5 is an alternative embodiment of the present invention in which the first opening 32 of the air duct 30 is directed downward and receives air through an opening at the bottom portion of the cowl 12 rather than through the front portion 40. Other than this downwardly directed first opening 32, the embodiment of the present invention shown in FIG. 5 operates similarly to that described above in conjunction with FIGS. 1–4 in order to create a convection flow of air from the first opening 32 to the second opening 34 and thereby out of the cowl 12 in order to conduct heat away from the fuel system components 80.

Figure 6:
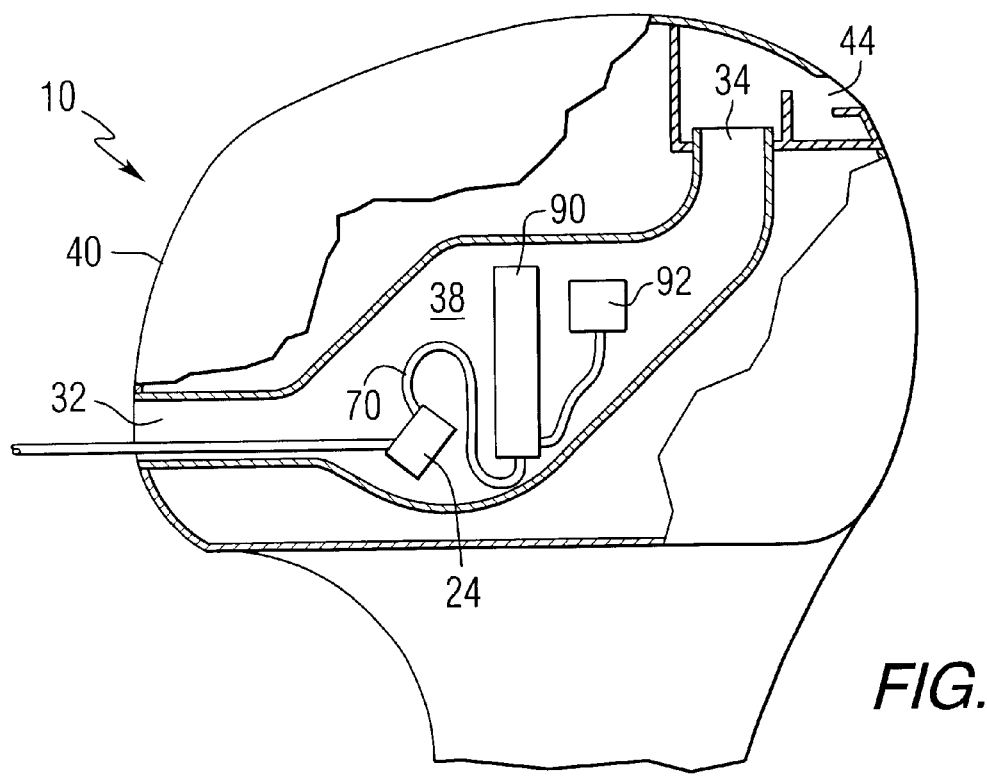
FIG. 6 shows the present invention used in conjunction with a fuel injected system.

The embodiment of the present invention shown in FIG. 6 is generally similar to that shown in FIG. 2, except that the fuel system components or those that are typically used in a fuel injected engine. For example, FIG. 6 illustrates a fuel rail 90 and an air compressor 92 that are representative of fuel system components associated with a fuel injected engine. These components are disposed within the chamber 38 and receive the benefits of convection cooling from the air that flows into the first opening 32 through the chamber 38, and out of the second opening 34.

All of the embodiments of the present invention exhibit certain common characteristics. First, they comprise an air duct 30 which has a first opening 32 and a second opening 34 that are arranged relative to each other to encourage the creation of convection currents of air flow that take heat from the fuel system components 80 and remove them from the outboard motor 10. The second opening 34 is typically arranged above the first opening 32 to encourage the convection flow of air that results from the natural tendency of warm air to rise. This convection flow then draws cooler air from outside of the outboard motor into the first opening 32 to replenish the air within the chamber 38 that is in thermal communication with the components of the fuel system. The first opening 32 need not intersect the front portion 40 of the cowl 12. Instead, it can intersect the rear portion 80 of the cowl 12, as shown in FIG. 3, or the bottom portion of the cowl 12 as shown in FIG. 5. The fuel system components need not be for a carbureted engine. Alternatively, the fuel system components can be used in conjunction with a fuel injected engine. Although the second opening 34 is illustrated as being located at the rearward portion of the outboard motor 10, it should be understood that this location is not limiting to the present invention.

Although the present invention has been described to specifically illustrate several alternative embodiments of the present invention, it should be understood that alternative embodiments are also within its scope.

We claim:

1. An outboard motor ventilation system, comprising:
   an engine;
   a cowl having a cavity therein, said engine being disposed within said cavity;
   a fuel system component connected in fluid communication with said engine to supply fuel to one or more combustion chambers of said engine, said fuel system component being external from said engine and disposed under said cowl;

an air duct disposed within said cavity of said cowl, said air duct having a first opening and a second opening, said air duct defining a chamber therein, said chamber being disposed in fluid communication between said first and second openings, said fuel system component being at least partially disposed within said is chamber, said first and second openings connecting said chamber in fluid communication with air which is outside of said cowl; and whereby a stream of air is directed through said chamber and between said first and second openings.

2. The ventilation system of claim 1, wherein:

said air duct is formed to inhibit air flow between said cavity and said chamber.

3. The ventilation system of claim 1, wherein:

said first opening is disposed at a lower location than said second opening to facilitate the natural convection flow of heated air through said chamber from said first opening to said second opening.

4. The ventilation system of claim 1, wherein:

said first opening is disposed at a front portion of said outboard motor.

5. The ventilation system of claim 1, wherein:

said second opening is disposed at a back portion of said outboard motor.

6. The ventilation system of claim 1, wherein:

said fuel system component is a fuel pump.

7. The ventilation system of claim 1, wherein:

said fuel system component is a fuel conduit.

8. The ventilation system of claim 1, wherein:

said fuel system component is a fuel rail.

9. The ventilation system of claim 1, wherein:

said fuel system component is a carburetor.

10. The ventilation system of claim 1, wherein:

said fuel system component is a compressor.

11. The ventilation system of claim 1, wherein:

said air duct is formed to prevent air flow between said cavity and said chamber.

12. An outboard motor ventilation system, comprising:

an engine;

a cowl having a cavity therein, said engine being disposed within said cavity;

a fuel system component connected in fluid communication with said engine to supply fuel to one or more combustion chambers of said engine, said fuel system component being external from said engine and disposed under said cowl;

an air duct disposed within said cavity of said cowl, said air duct having a first opening and a second opening, said air duct defining a chamber therein, said chamber being disposed in fluid communication between said first and second openings, said fuel system component being at least partially disposed within said chamber, said first and second openings connecting said chamber in fluid communication with air which is outside of said cowl, said air duct being formed to inhibit air flow between said cavity and said chamber, said first opening being disposed at a lower location than said second opening to facilitate the natural convection flow of heated air through said chamber from said first opening to said second opening; and whereby a stream of air is directed through said chamber and between said first and second openings.

13. The ventilation system of claim 12, wherein:

said first opening is disposed at a front portion of said outboard motor.

14. The ventilation system of claim 13, wherein:

said second opening is disposed at a back portion of said outboard motor.

15. The ventilation system of claim 14, wherein:

said fuel system component is a fuel pump.

16. The ventilation system of claim 14, wherein:

said fuel system component is a fuel conduit.

17. The ventilation system of claim 12, wherein:

said air duct is formed to prevent air flow between said cavity and said chamber.

18. An outboard motor ventilation system, comprising:

an engine;

a cowl having a cavity therein, said engine being disposed within said cavity;

a fuel system component connected in fluid communication with said engine to supply fuel to one or more combustion chambers of said engine, said fuel system component being external from said engine and disposed under said cowl;

an air duct disposed within said cavity of said cowl, said air duct having a first opening and a second opening, said air duct defining a chamber therein, said chamber being disposed in fluid communication between said first and second openings, said fuel system component being at least partially disposed within said chamber, said first and second openings connecting said chamber in fluid communication with air which is outside of said cowl, said air duct being formed to inhibit air flow between said cavity and said chamber, said first opening being disposed at a lower location than said second opening to facilitate the natural convection flow of heated air through said chamber from said first opening to said second opening, said first opening being disposed at a front portion of said outboard motor, said second opening being disposed at a back portion of said outboard motor, said fuel system component being a fuel conduit; and whereby a stream of air is directed through said chamber and between said first and second openings.

19. The ventilation system of claim 18, further comprising:

a fuel pump disposed within said chamber.

20. The ventilation system of claim 18, wherein:

said air duct is formed to prevent air flow between said cavity and said chamber.

* * * * *